United States Patent [19]
Jones

[11] 3,853,331
[45] Dec. 10, 1974

[54] INFLATABLE OCCUPANT RESTRAINT SYSTEM

[75] Inventor: Trevor O. Jones, Birmingham, Mich.

[73] Assignee: General Motors Corporation, Detroit, Mich.

[22] Filed: Dec. 21, 1973

[21] Appl. No.: 427,341

[52] U.S. Cl. ........ 280/150 AB, 180/104, 200/61.44
[51] Int. Cl. ............................................. B60r 21/10
[58] Field of Search ...... 280/150 AB; 180/103, 104; 200/61.42, 61.43, 61.44, 82 C

[56] References Cited
UNITED STATES PATENTS

| | | | |
|---|---|---|---|
| 3,049,359 | 8/1962 | Geyer | 280/6.1 X |
| 3,292,726 | 12/1966 | Jette | 180/104 |
| 3,495,675 | 2/1970 | Hass et al. | 280/150 AB X |
| 3,668,627 | 6/1972 | Brainerd | 180/103 |
| 3,768,088 | 10/1973 | Risius | 200/61.44 X |
| 3,804,435 | 4/1974 | See et al. | 280/150 AB |

Primary Examiner—Kenneth H. Betts
Attorney, Agent, or Firm—Herbert Furman

[57] ABSTRACT

An inflatable occupant restraint system includes an inflatable occupant restraint cushion and an inflator for inflating the cushion. A roll-over sensing arrangement for actuating the inflator includes, in one embodiment, normally open switches mounted on the shock absorbers on each side of the body. The switches on each side are in series with each other and with the inflator across a source of power. When a roll-over occurs and the shock absorbers on one side of the body are substantially fully extended, their respective switches are closed to actuate the inflator. In another embodiment, the normally open switches on the shock absorbers on one side of the body are in series with each other, with the inflator and source of power, and with normally closed switches on the shock absorbers on the other side of the body. The normally closed switches are opened when the shock absorbers are extended beyond their normal position.

3 Claims, 4 Drawing Figures

PATENTED DEC 10 1974  3,853,331

INFLATABLE OCCUPANT RESTRAINT SYSTEM

This invention relates generally to inflatable occupant restraint systems for vehicles and more particularly to a rollover sensing arrangement for an inflatable occupant restraint system.

Occupant restraint systems of the type including an inflatable occupant restraint cushion and an inflator for inflating the cushion are known. The inflator can be actuated by inertial sensors sensing deformation of the body, crush switches sensing displacement of the bumper, velocity switches sensing a change in velocity of the vehicle, radar, or laser, or combination of these. None of these at the present time sense a rollover condition of the vehicle.

The sensing arrangement of this invention is particularly intended for use with such systems to actuate the inflator when a roll-over condition occurs. Normally the sprung vehicle body is supported on the unsprung mass in a number of different arrangements. However, these arrangements include extendible and retractable shock absorbers for damping relative movement between the unsprung mass and the sprung body. The sensing arrangement of this invention employs the extension and retraction movement of the shock absorbers to sense the roll-over condition. In one embodiment, the shock absorbers on each side of the body are provided with normally open switches connected in series with each other and with the inflator across the source of power. When both switches on one side of the body are closed, the inflator is actuated to inflate the cushion. Both switches can be closed only when both shock absorbers on one side of the body are substantially fully extended. Normally, this occurs only during a roll-over condition. In another embodiment, the shock absorbers are each additionally provided with a normally closed switch which is opened when the shock absorber is extended beyond its normal position. The normally open switches of the shock absorbers on one side of the body are connected in series with the normally closed switches of the shock absorbers on the other side of the body. This ensures that actuation of the inflator can occur only when the shock absorbers on one side of the body are substantially fully extended while those on the other side of the body are either in their normal position or retracted less than their normal position.

The primary feature of this invention is that it provides an improved roll-over sensing arrangement for vehicle bodies for actuating an inflatable occupant restraint cushion. Another feature of this invention is that the sensing arrangement is actuated by the extension and retraction movement of the shock absorbers interconnecting the sprung body mass and the unsprung mass supporting the body mass on the roadway. A further feature of this invention is that the shock absorbers on each side of the body include normally open switches which can be closed only when the shock absorbers are substantially fully extended such as occurs under roll-over separation of the sprung body and unsprung mass. Yet another feature of this invention is that the normally open switches on one side of the body are additionally connected to normally closed switches on the other side of the body, with the latter remaining closed only when their respective shock absorbers are in their normal position or retracted to less than their normal position.

These and other features of this invention will be readily apparent from the following specification and drawings wherein.

Figure 1:
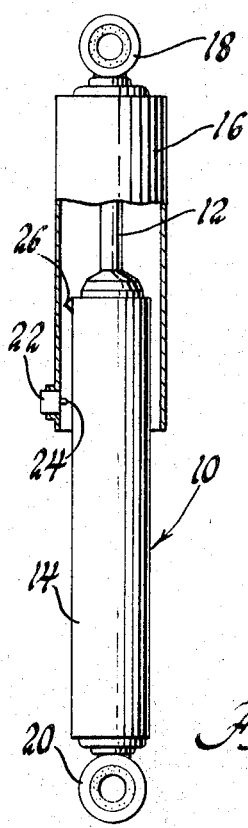
FIG. 1 is a view showing the manner in which the normally open switches of this embodiment are mounted on a respective shock absorber.

The manner in which a sprung body is mounted on an unsprung mass supporting the body on the roadway is well known and therefore it is not believed that any further description is necessary. It is also well known that mounting of the body on the unsprung mass includes extendible and retractable shock absorbers on each side of the body, with each such shock absorber being normally located generally adjacent each of the roadway-engaging wheels which support the unsprung mass on the roadway. Such shock absorbers are well known and generally include an extendible and retractable arrangement of a piston rod and piston moving relative to a closed fluid containing cylinder. A shield mounted on the piston rod moves therewith relative to the cylinder. This is shown schematically in FIG. 1 of the drawings wherein a conventional shock absorber 10 includes a piston and piston rod assembly 12 which moves telescopically relative to a fluid containing cylinder 14 to dampen movement of a sprung body relative to an unsprung mass. A shield 16 is secured to the rod 12 for movement therewith. The shield 16 is secured to rod 12 adjacent the eyelet end 18 thereof which is normally connected to the sprung body. The eyelet end 20 of the cylinder 14 is normally connected to the unsprung mass.

In accordance with this invention, a normally open conventional switch 22 is mounted on the shield 16 and the actuator 24 of this switch extends inwardly of the shield and in the path of movement of a generally triangularly shaped lug 26 mounted on the cylinder 14. It can be seen that the switch 22 remains normally open when the shock absorber is in all positions other than substantially fully extended position.

Figure 2:
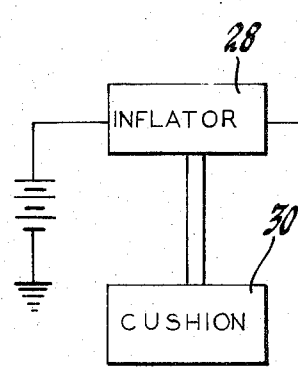
FIG. 2 is a schematic of the sensing arrangement according to one embodiment of the invention.
Figure 2:
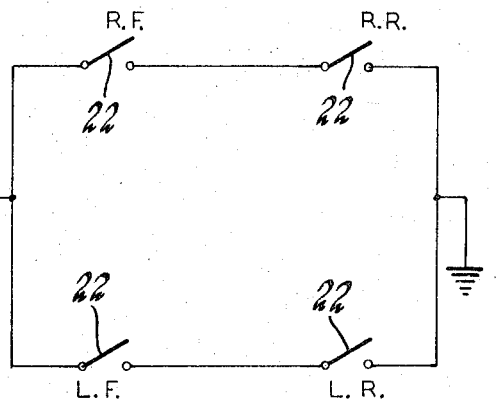

As shown in FIG. 2, the normally open switches of the right front and right rear, designated R.F. and R.R., shock absorbers on one side of the body are connected in series across a conventional inflator 28 and a source of power. Likewise, the normally open switches of the left front and left rear, designated L.F. and L.R., shock absorbers on the other side of the body are connected in series with each other and with the inflator 28 across the source of power. The inflator 28 when actuated inflates a conventional cushion 30.

Should the shock absorbers on either the right or left side of the body be substantially fully extended, such as occurs upon roll-over separation of the sprung body and unsprung mass, the switches 22 on such side of the body will be closed as their respective shock absorbers become fully extended to actuate the inflator 28 and inflate the cushion 30.

Figure 3:
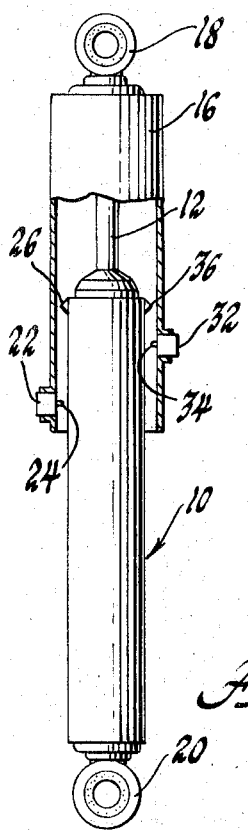
FIG. 3 is a view showing the manner in which the switches of this embodiment are mounted on a respective shock absorber.
Figure 4:
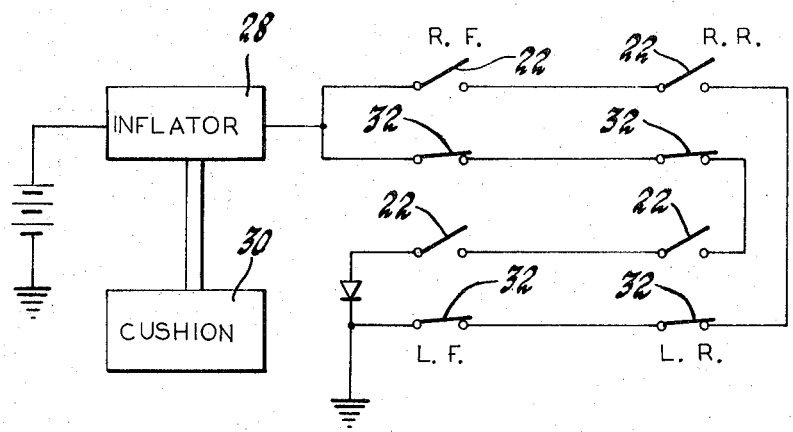
FIG. 4 is a schematic of another embodiment of this invention.

FIGS. 3 and 4 show an alternate embodiment. Like numerals have been used for like parts. The shock absorber 10 includes an additional normally closed switch 32 on the shield 16 having an actuator 34 extending inwardly of the shield. An additional lug 36 is provided on the cylinder 14 to actuate switch 32.

Referring now to FIG. 4, the normally open switches 22 of the right front and right rear shock absorbers are connected in series with the normally closed switches 32 on the left front and left rear shock absorbers and also in series with the inflator 28 across the source of power. Likewise, the normally open switches 22 of the left front and left rear shock absorbers are connected in series with the normally closed switches 32 of the right front and right rear shock absorbers and also in series with the inflator 28 across the source of power. Thus, the shock absorbers on one side of the body must be in a fully extended position while those on the other side of the body must be in a normal position or in a retracted position less than this normal position before the inflator 28 will be actuated. This ensures that any separation of the sprung body and unsprung mass must be on one side only before the inflator is actuated.

It will be understood that the ignition switch will be in series between the battery and the inflator such that the inflator will only be connected to the battery when the ignition switch is in an ON position. This will permit the vehicle to be jacked up or raised with all four shock absorbers in an extended position for service without having the inflator actuated.

Thus, this invention provides an improved inflatable occupant restraint system.

I claim:

1. In combination with a vehicle including a sprung body, an unsprung mass supporting the body, a plurality of extendible and retractable shock absorbers connected between the sprung body and unsprung mass and arranged in pairs along the respective sides of the sprung body, an occupant restraint system comprising, an inflatable occupant restraint cushion, means for inflating the cushion, means on each shock absorber sensing substantially full extension thereof, and control means responsive to the sensing means of one of the pairs of shock absorbers sensing substantially full extension of their respective shock absorbers occurring upon roll-over separation of the sprung body and unsprung mass for actuating the inflating means to inflate the cushion.

2. In combination with a vehicle including a sprung body, an unsprung mass supporting the body, a plurality of extendible and retractable shock absorbers connected between the sprung body and unsprung mass and arranged in pairs along the respective sides of the sprung body, an occupant restraint system comprising, a source of power, an inflatable occupant restraint cushion, means actuated by the source of power for inflating the cushion, switch means on each shock absorber actuated upon substantially full extension thereof, and control means responsive to the switch means of one of the pairs of shock absorbers sensing substantially full extension of their respective shock absorbers occurring upon roll-over separation of the sprung body and unsprung mass for connecting the inflating means across the source of power to actuate the inflating means to inflate the cushion.

3. In combination with a vehicle including a sprung body, an unsprung mass supporting the body, a plurality of extendible and retractable shock absorbers connected between the sprung body and unsprung mass and arranged in pairs along the respective sides of the sprung body, an occupant restraint system comprising, an inflatable occupant restraint cushion, means for inflating the cushion, first means on each shock absorber sensing substantially full extension thereof, second means on each shock absorber sensing generally full retraction thereof, and control means responsive to the first sensing means of one pair of shock absorbers sensing substantially full extension of their respective shock absorbers and the second sensing means of the other pair of shock absorbers sensing generally full retraction of their respective shock absorbers occurring upon roll-over separation of the sprung body and unsprung mass for actuating the inflating means to inflate the cushion.

* * * * *